R. CLADE.
GOVERNING MECHANISM FOR WINDMILLS.
APPLICATION FILED APR. 12, 1915.

1,190,630.
Patented July 11, 1916.
5 SHEETS—SHEET 1.

Fig. 1

Witnesses
J. F. Coleman
J. A. Mulvey

Inventor
Robert Clade
by Dyer Taylor
Attorneys.

R. CLADE.
GOVERNING MECHANISM FOR WINDMILLS.
APPLICATION FILED APR. 12, 1915.

1,190,630.

Patented July 11, 1916.
5 SHEETS—SHEET 4.

Witnesses
J. F. Coleman
J. A. Malvey

Inventor
Robert Clade
by Dyer Taylor
Attorneys.

R. CLADE.
GOVERNING MECHANISM FOR WINDMILLS.
APPLICATION FILED APR. 12, 1915.

1,190,630.

Patented July 11, 1916.
5 SHEETS—SHEET 5.

UNITED STATES PATENT OFFICE.

ROBERT CLADE, OF NEWARK, NEW JERSEY, ASSIGNOR TO AIR TURBINE COMPANY OF AMERICA, OF JERSEY CITY, NEW JERSEY, A CORPORATION OF NEW JERSEY.

GOVERNING MECHANISM FOR WINDMILLS.

1,190,630.     Specification of Letters Patent.     Patented July 11, 1916.

Application filed April 12, 1915. Serial No. 20,637.

*To all whom it may concern:*

Be it known that I, ROBERT CLADE, a subject of the Grand Duke of Baden, resident of Newark, county of Essex, State of New Jersey, have invented a certain new and useful Governing Mechanism for Windmills, of which the following is a specification.

This invention relates to windmills of the type having a vertical shaft and horizontal rims between which vanes turn upon axes adjacent to their forward edges and is of the type illustrated in my copending application for patent entitled "Windmills" filed on even date herewith and numbered serially 20,635.

The objects of the invention are to produce a governor which will keep the speed of the windmill within a safe limit.

A further object is to produce a device for stopping the mill when desired.

These and further objects will more fully appear from the following specification and accompanying drawings considered together or separately.

In the drawings.

In all views like parts are designated by the same reference characters.

The windmill illustrated comprises a shaft 1 carrying rims 2, 2. These rims are supported from the shaft by means of spokes 3, 3. The rims are connected together by rods 4, 4. On these rods are mounted vanes 5. The vanes are mounted on axes adjacent to one edge, so that they can swing freely inward, or outward, beyond the planes of the rims. Each vane is provided with an arm 6. In connection with these arms is a transmission ring 7. This transmission ring is connected to the arms by suitable stays 8. The ring is made of links 9, see Figs. 9 and 10, and with an expansible member 10. So much of the mechanism just described is similar to that illustrated in my copending application for patent hereinbefore referred to.

The primary purpose of the present invention is to govern the speed of the mill, or to stop its rotation when desired, by reducing the amount of eccentricity of the transmission ring in relation to the shaft 1 to govern its speed, or by centering the ring in relation to the shaft, to arrest its rotation. When the transmission ring is uninfluenced by any outside mechanism it assumes a position eccentric to the shaft and its configuration becomes distorted to the form shown in full lines in Figures 2 and 4. If this transmission ring is made to assume a circular form concentric with the shaft 1 the tension on all the stays 8 will be such as to hold the vanes in the tangential position shown in Figs. 2 and 4 in broken lines. This will stop the mill.

The manner of operation of the ring in association with the vanes is clearly described in my copending application before referred to.

In connection with the transmission ring I employ a centrifugal ring 120. This centrifugal ring is like the ring 15 illustrated in my copending application for patent above referred to Serial No. 825,206 and is so-called because it resists outward stresses caused by centrifugal strains due to rotation. This centrifugal ring is connected to the vanes by means of stays 130 preferably made of flexible wire rope. Each of these stays is secured to the vane at preferably about its center, as shown, by means of a connecting shackle 140.

Figure 4:
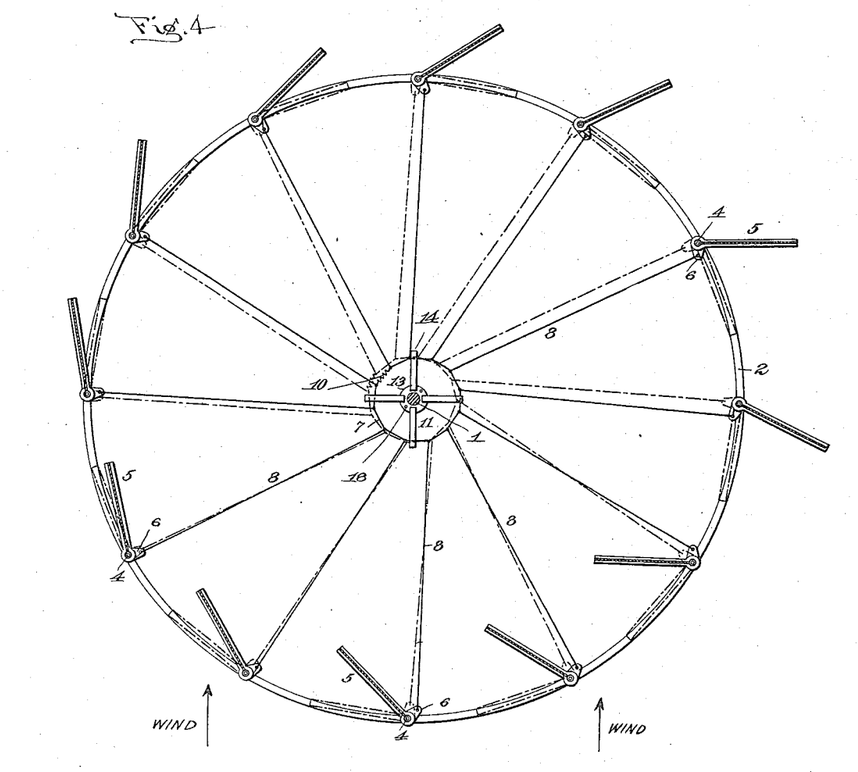
Fig. 4 is a sectional view of a windmill looking downward.

The governor comprises a governing cone 11 associated with a governing mechanism 12. The cone is adapted to be moved longitudinally in relation to the shaft 1. Its maximum diameter is about the same as the diameter of the transmission ring. The shape of the cone at its maximum diameter is concentric with the shaft 1 therefore when the cone is moved in such a position that it engages with the transmission ring at that part of the cone of maximum diameter the ring will be centered in a position concentric to the shaft, and the vanes will be held in the tangential position, as shown in Fig. 4. The governing mechanism is connected to the governing cone so as to move the latter longitudinally in relation to the shaft so that the ends described in the preceding sentence may be attained.

Figures 5, 6, 7:
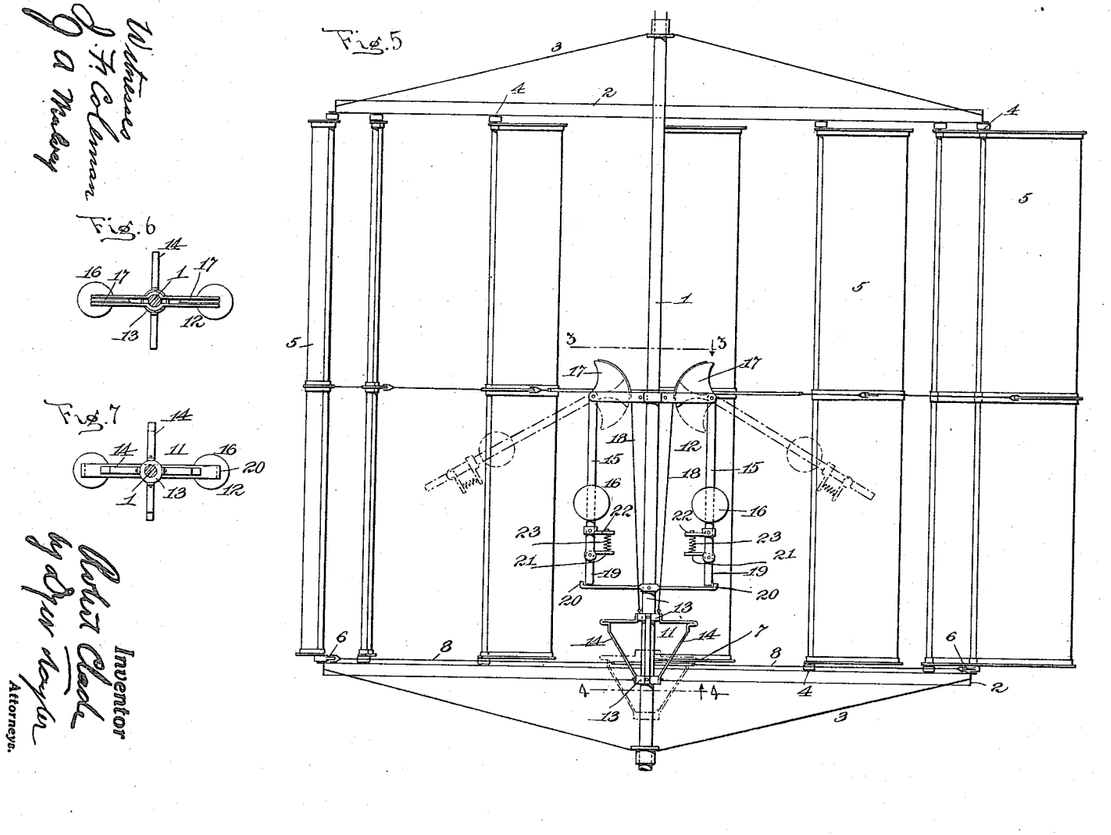
Fig. 5 is a longitudinal sectional view of a windmill showing a modified governing device.
Fig. 6 is a sectional view on the line 3—3 of Fig. 5 looking downward.
Fig. 7 is a sectional view on the line 4—4 of Fig. 5 looking upward.

In the embodiment chosen for illustration and shown in Figs. 5 and 7 inclusive, the governing cone is made up of sleeves 13, 13 connected together by means of brackets 14, 14. These brackets as shown are four in number, although the number may be varied. Their shape is such that at about their maximum width they constitute a frame or basket concentric with the shaft and substantially the same size as the internal diameter of the transmission ring. Their minimum diameter is sufficient to allow the ring to partake of any degree of eccentricity necessary for the proper functioning of the mill. The governing mechanism in the embodiment chosen for illustration is made up as follows: The governing cone is connected to the centrifugal ring 120 by means of links or stays 150. The length of the links or stays is such that when the ring is in substantially the same plane as the connections to the vanes, illustrated in solid lines in Fig. 1, the cone will be elevated so as to hold the transmission ring in concentric position in relation to the shaft, thus moving all the vanes to the tangential position shown in the broken lines in Fig. 2. When the mill is operating at a speed not greater than that which is to be checked by the governing mechanism, the centrifugal forces acting against the vanes to turn them outward beyond the perimeter of the rims, will be insufficient to raise the centrifugal ring 120 against the force of gravitation. As the speed increases, the centrifugal forces will tend to turn all the vanes outward, even those on the windward side of the wheel, and will overcome the force of gravity and will elevate the centrifugal ring 120. This through the agency of the stays 150 will elevate the governing cone 12 to a point where it will engage with the inner side of the transmission ring 7 and will restrict the amount of eccentricity of the latter. As the speed increases the centrifugal ring will be elevated and the governing cone lifted more, thus further confining the freedom of eccentrical movement of the transmission ring. This ring, through the agency of the stays 8, and arm 6, will move the vanes to the tangential position as it itself assumes the concentric position.

A further modification is illustrated in Figs. 4 to 7 inclusive: A plurality of governing arms 15 carrying weights 16 are pivoted to the frame carried by the shaft 1. These arms are shown two in number but the number may be varied. Each arm carries a sector 17 beyond the point of pivot and each sector is connected to the cone by means of a strap 18. It is apparent that as the device rotates the centrifugal stresses acting upon the weights 16 will move the latter outward as shown in broken lines in Fig. 5. This will rotate the sector 17 and through the agency of the straps 18 will lower the cone. When it reaches the broken line position its maximum diameter will be about on a level with the transmission ring and the latter will be centered.

For the purpose of preventing the governing mechanism from responding to any slight or trivial increase in speed, the following mechanism is employed: Each arm is provided with a latch 19. This latch is adapted to engage with a catch 20 carried by the shaft 1. The latch is provided with an arm 21. The governor arm is provided with a fixed arm 22 and these two arms, 21 and 22, are connected together by a spring 23. The latch engaging with the catch to hold the governor arm in vertical position until the centrifugal stress, caused by the part movement of the weights, overcomes the tension of the spring 23 and allows the latter to turn upon its axis, releasing it from the catch 20. When the speed of the mill diminishes so that the governor arm swings inward, the latch will engage with the catch and expand the spring 23 until the arm has swung in to a point where the latch will engage beyond the catch.

Figures 8, 9, 10, 11:
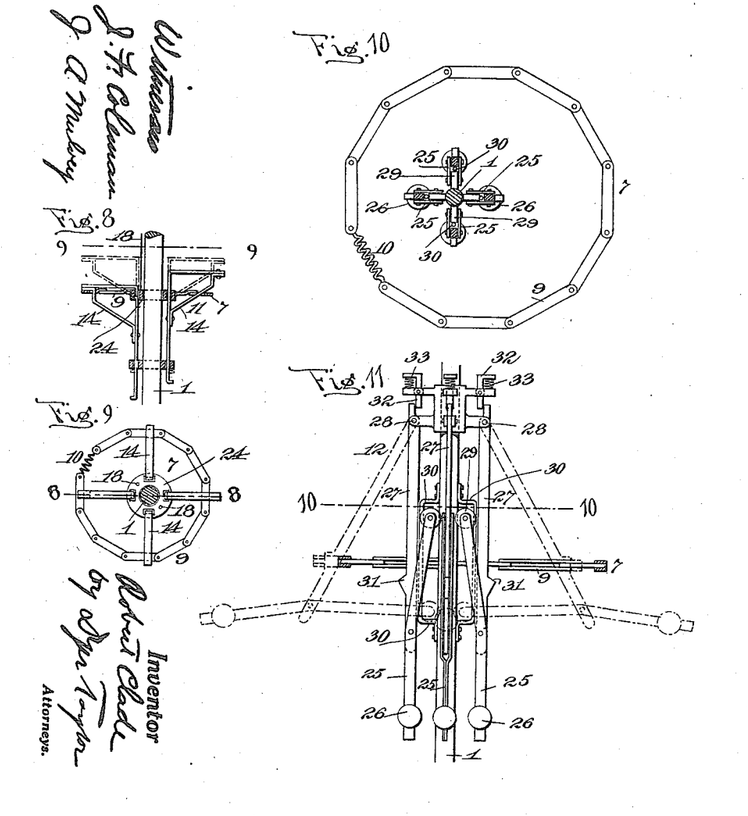
Fig. 8 is a detail view in section on the line 8—8 of Fig. 9, showing a modification of a portion of the governing mechanism.
Fig. 9 is a sectional view on the line 9—9 of Fig. 8 looking downward.
Fig. 10 is a sectional view on the line 10—10 of Fig. 11 showing, on an enlarged scale, a further modification.
Fig. 11 is an elevation of the same.

In the modification of the invention shown in Figs. 8 and 9 the brackets 14 are separate and are connected to a collar 24 which freely moves on the shaft 1. Each bracket is capable of independent movement on the collar. The purpose of this modification is to provide a means for insuring the lowering of the cone irrespective of the side pressure of the transmission ring upon one of the brackets. When the ring is very much to one side it will engage with and support one of the brackets and will keep it from lowering by its own weight. The bracket on the other side of the wheel, however, being unsupported will drop. Consequently, as the mill rotates these brackets will successively drop in place and will center the ring.

In the modification shown in Figs. 10 and 11 the governing mechanism is made as follows: The governing mechanism is combined with the governing cone. Arms 25 carry the governor weights 26. These arms are connected to links 27 through suitable pivots and the links in turn are connected to pivots 28 on the shaft 1. The inner end of each arm 25 is provided with a roller 29 adapted to run vertically between a guide 30 carried by the shaft 1, and the shaft. On the link 27 is an abutment 31 adapted to engage with the transmission ring 7 when the link is moved outward to the broken line position shown in Fig. 11. It is apparent that as the centrifugal stresses move the weights 26 outward they will also move the links 27 outward and the abutments 31 will be caused to engage with the inner edge of the transmission ring. In this modification a latch 32 is held in place by a spring 33. This latch prevents the outward movement of the links until the speed is increased up to a point where it should be regulated.

Figures 12, 13:
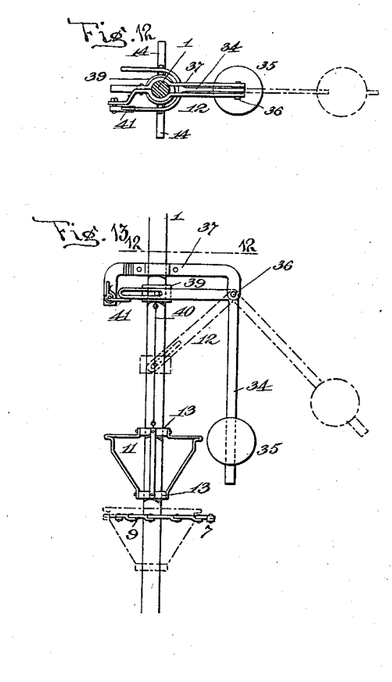
Fig. 12 is a sectional view on the line 12—12 of Fig. 13 of another modification.
Fig. 13 is a side view of the same.

In the modification shown in Figs. 12 and 13 the mechanism is made as follows: A bell crank lever 34 carries a governor weight 35. This lever is attached by means of a pivot 36 to a bracket 37. A collar 39 slides on the shaft. This collar is provided with a pin engaging with slots in the bifurcated end of one arm of the bell crank lever 34. The collar is connected to the governing cone by means of straps 40. A spring latch 41 prevents movement outward of the governor weight until the speed of the mill exceeds the maximum amount.

Figure 1:
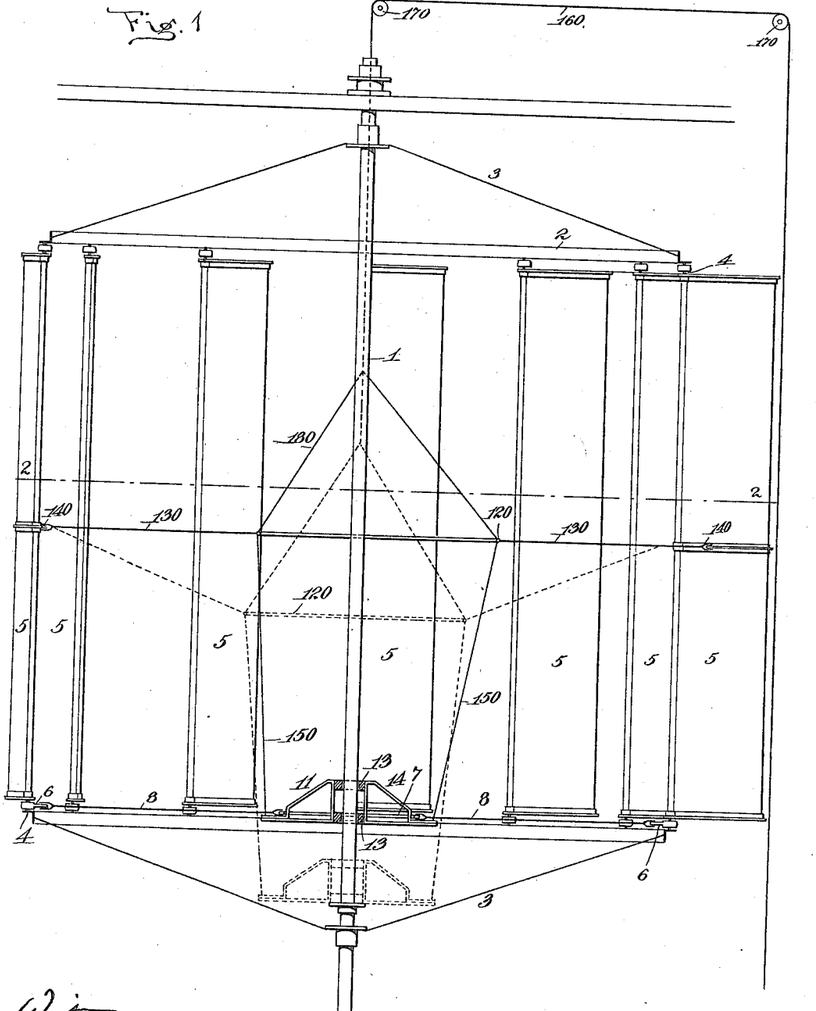
Figure 1 is a longitudinal sectional view, taken on the line 1—1 of Fig. 2, of a windmill embodying my invention.
Figure 3:
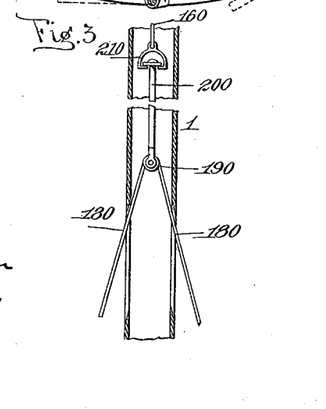
Fig. 3 is an enlarged view partly in section of a portion of the stopping mechanism.

Figs. 1 and 3 illustrate means for stopping the rotation of the mill when desired. These means, in the embodiment chosen for illustration, comprise a connector such as a cord or wire 160 passing over pulleys 170, 170 to the central bore of the shaft 1. This conductor is attached to the centrifugal ring 120 by suitable means, such as a bridle 180. As shown in Fig. 3 the bridle may pass over a pulley 190 to equalize strains, such pulley being carried on a stirrup 200. This stirrup is attached to the connector 160 by a swivel 210 permitting the stirrup to turn without twisting the connector. By pulling on the connector the centrifugal ring will be raised, raising the governing cone and centering the transmission ring, thus stopping the mill.

Figure 2:
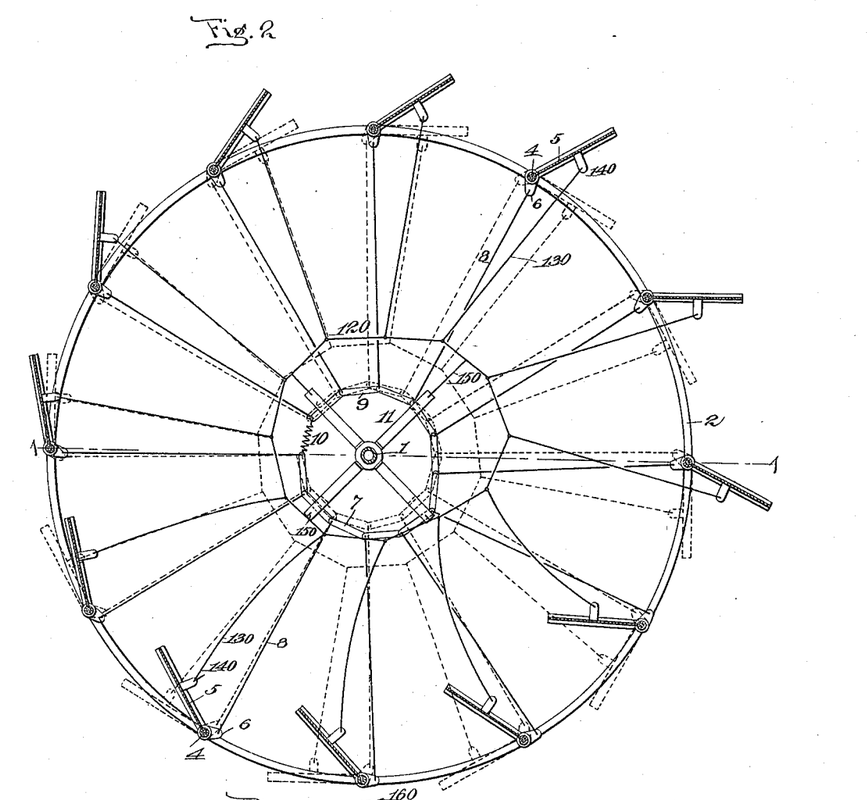
Fig. 2 is a sectional view of the same taken on the line 2—2 of Fig. 1.

The arms 6 attached to the vanes are preferably not located at 90° but at a greater angle, say about 120° as shown in Fig. 2. The purpose of this arrangement is to equalize the pressure of the wind on the vanes at the windward side of the mill. The extent of movement of the stays 8 is increased when the vane is in the tangential position, to a greater extent than if the arm were 90° to the vane. If with the arrangement shown in Fig. 2 the vane be in tangential position, and the transmission ring eccentric to the shaft, the pressure of wind on the vanes will be resisted by a pull on the stay, acting on the arm 6 at a more effective angle than if the arm were 90° as in Fig. 4.

A further advantage because of the location of the arms 6 at a greater angle than 90° is that the stays 8 may be adjusted with some degree of slackness. This will take the load off of the bearings, and thus allow the vanes to be turned by means of very light breezes. The angle of the arms keeps the vanes in the tangential position when the transmission ring is centered.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:

1. In a windmill, a vertical shaft, a plurality of rims carried thereby, a plurality of vanes mounted to turn on vertical axes between the rims, a flexible ring surrounding the shaft and free to move eccentrically in relation thereto, connections between the ring and vanes, and means controlled by the rotation of the mill to limit the eccentricity of the ring.

2. In a windmill, a vertical shaft, a plurality of rims carried thereby, a plurality of vanes mounted to turn on vertical axes between the rims, a flexible ring surrounding the shaft and free to move eccentrically in relation thereto, connections between the ring and vanes, and means for holding the ring concentric to the shaft.

3. In a windmill, a vertical shaft, a plurality of rims carried thereby, a plurality of vanes mounted to turn on vertical axes between the rims, a flexible ring surrounding the shaft and free to move eccentrically in relation thereto, connections between the ring and vanes, a governing cone moving longitudinally in relation to the shaft, and means for moving the cone to engage with the ring.

4. In a windmill, a vertical shaft, a plurality of rims carried thereby, a plurality of vanes mounted to turn on vertical axes between the rims, a flexible ring surrounding the shaft and free to move eccentrically in relation thereto, connections between the ring and vanes, a governing cone surrounding the shaft and capable of longitudinal movement in relation thereto, and means controlled by the rotation of the mill to move said cone.

5. In a windmill, a vertical shaft, a plurality of rims carried thereby, a plurality of vanes mounted to turn on vertical axes between the rims, a ring surrounding the shaft and free to move eccentrically in relation thereto, connections between the ring and vanes to one side of the axes of the latter, a second ring surrounding the shaft, connections between the second ring and the vanes at the opposite side of the axes thereof, governing means moving longitudinally in relation to the shaft to confine and reduce the eccentricity of the first ring, and connections between the said means and the second ring, whereby said second ring will be raised, by centrifugal stresses on the vanes, and will raise said governing means.

6. In a windmill, a vertical shaft, a plurality of rims carried thereby, a plurality of vanes mounted to turn on vertical axes between the rims, a ring surrounding the shaft, free to move eccentrically in relation thereto, connections between the rim and vanes at one side of the axes thereof, a second ring surrounding the shaft, connections between said ring and vanes at the opposite side of the axes thereof, a governing cone surrounding the shaft, and capable of movement longitudinally in relation thereto, and connections between said cone and said second ring.

7. In a windmill, a vertical shaft, a plurality of rims carried thereby, a plurality of vanes mounted to turn on vertical axes between the rims, a ring surrounding the shaft, free to move eccentrically in relation thereto, connections between the rim and vanes at one side of the axes thereof, a second ring surrounding the shaft, connections between said ring and vanes at the opposite side of the axes thereof, a governing cone surrounding the shaft and capable of movement longitudinally in relation thereto, connections between said cone and second ring, and means for manually raising the second ring.

8. In a windmill, a vertical shaft, a plurality of rims carried thereby, a plurality of vanes mounted to turn on vertical axes between the rims, a flexible ring surrounding the shaft and free to move eccentrically in relation thereto, connections between the ring and vanes to one side of the axes of the latter, a second ring surrounding the shaft, connections between the second ring and the vanes at the opposite side of the axes thereof, governing means moving longitudinally in relation to the shaft to confine and reduce the eccentricity of the first ring, and connections between the said means and the second ring, whereby said second ring will be raised, by centrifugal stresses on the vanes, and will raise said governing means.

9. In a windmill, a vertical shaft, a plurality of rims carried thereby, a plurality of vanes mounted to turn on vertical axes between the rims, a flexible ring surrounding the shaft, free to move eccentrically in relation thereto, connections between the ring and vanes at one side of the axes thereof, a second ring surrounding the shaft, connections between said ring and vanes at the opposite side of the axes thereof, a governing cone surrounding the shaft, and capable of movement longitudinally in relation thereto, and connections between said cone and said second ring.

10. In a windmill, a vertical shaft, a plurality of rims carried thereby, a plurality of vanes mounted to turn on vertical axes between the rims, a flexible ring surrounding the shaft, free to move eccentrically in relation thereto, connections between the ring and vanes at one side of the axes thereof, a second ring surrounding the shaft, connections between said ring and vanes at the opposite side of the axes thereof, a governing cone surrounding the shaft and capable of movement longitudinally in relation thereto, connections between said cone and said ring, and means for manually raising the second ring.

11. In a windmill, a vertical shaft, a plurality of rims carried thereby, a plurality of vanes mounted to turn on vertical axes between the rims, an extensible ring surrounding the shaft and free to move eccentrically in relation thereto, connections between the ring and vanes, and means controlled by the rotation of the mill to limit the eccentricity of the ring.

12. In a windmill, a vertical shaft, a plurality of rims carried thereby, a plurality of vanes mounted to turn on vertical axes between the rims, an extensible ring surrounding the shaft and free to move eccentrically in relation thereto, connections between the ring and vanes, and means for holding the ring concentric to the shaft.

13. In a windmill, a vertical shaft, a plurality of rims carried thereby, a plurality of vanes mounted to turn on vertical axes between the rims, an extensible ring surrounding the shaft and free to move eccentrically in relation thereto, connections between the ring and vanes, a governing cone moving longitudinally in relation to the shaft, and means for moving the cone to engage with the ring.

14. In a windmill, a vertical shaft, a plurality of rims carried thereby, a plurality of vanes mounted to turn on vertical axes between the rims, an extensible ring surrounding the shaft and free to move eccentrically in relation thereto, connections between the ring and vanes, a governing cone surrounding the shaft and capable of longitudinal movement in relation thereto, and means controlled by the rotation of the mill to move said cone.

15. In a windmill, a vertical shaft, a plurality of rims carried thereby, a plurality of vanes mounted to turn on vertical axes between the rims, an extensible ring surrounding the shaft and free to move eccentrically in relation thereto, connections between the ring and vanes at one side of the axes of the latter, a second ring surrounding the shaft, connections between the second ring and the vanes at the opposite side of the axes thereof, governing means moving longitudinally in relation to the shaft to confine and reduce the eccentricity of the second ring, and connections between the said means and the second ring, whereby said second ring will be raised, by centrifugal stresses on the vanes, and will raise said governing means.

16. In a windmill, a vertical shaft, a plurality of rims carried thereby, a plurality of vanes mounted to turn on vertical axes between the rims, an extensible ring surrounding the shaft, free to move eccentrically in relation thereto, connections between the ring and vanes at one side of the axes thereof, a second ring surrounding the shaft, connections between said ring and vanes at the opposite side of the axes thereof, a governing cone surrounding the shaft, and capable of movement longitudinally in relation thereto, and connections between said cone and said second ring.

17. In a windmill, a vertical shaft, a plurality of rims carried thereby, a plurality of vanes mounted to turn on vertical axes between the rims, an extensible ring surrounding the shaft, free to move eccentrically in relation thereto, connections between the ring and vanes at one side of the axes thereof, a second ring surrounding the shaft, connections between said ring and vanes at the opposite side of the axes thereof, a governing cone surrounding the shaft and capable of movement longitudinally in relation thereto, connections between said cone and second ring, and means for manually raising the second ring.

18. In a windmill, a vertical shaft, a plurality of rims carried thereby, a plurality of vanes mounted to turn on vertical axes between the rims, an extensible, flexible ring surrounding the shaft and free to move eccentrically in relation thereto, connections between the ring and vanes to one side of the axes of the latter, a second ring surrounding the shaft, connections between the second ring and the vanes at the opposite side of the axes thereof, governing means moving longitudinally in relation to the shaft to confine and reduce the eccentricity of the first ring, and connections between the said means and the second ring, whereby said second ring will be raised, by centrifugal stresses on the vanes, and will raise said governing means.

19. In a windmill, a vertical shaft, a plurality of rims carried thereby, a plurality of vanes mounted to turn on vertical axes between the rims, an extensible, flexible ring surrounding the shaft, free to move eccentrically in relation thereto, connections between the ring and vanes at one side of the axes thereof, a second ring surrounding the shaft, connections between said ring and vanes at the opposite side of the axes thereof, a governing cone surrounding the shaft, and capable of movement longitudinally in relation thereto, and connections between said cone and said second ring.

20. In a windmill, a vertical shaft, a plurality of rims carried thereby, a plurality of vanes mounted to turn on vertical axes between the rims, an extensible, flexible ring surrounding the shaft, free to move eccentrically in relation thereto, connections between the ring and vanes at one side of the axes thereof, a second ring surrounding the shaft, connections between said ring and vanes at the opposite side of the axes thereof, a governing cone surrounding the shaft and capable of movement longitudinally in relation thereto, connections between said cone and said ring, and means for manually raising the second ring.

21. In a windmill, a vertical shaft, a plurality of rims carried thereby, a plurality of vanes mounted to turn on vertical axes between the rims, a flexible, extensible ring surrounding the shaft and free to move eccentrically in relation thereto, connections between the ring and vanes, and means controlled by the rotation of the mill to limit the eccentricity of the ring.

22. In a windmill, a vertical shaft, a plurality of rims carried thereby, a plurality of vanes mounted to turn on vertical axes between the rims, a flexible, extensible ring surrounding the shaft and free to move eccentrically in relation thereto, connections between the ring and vanes, and means for holding the ring concentric to the shaft.

23. In a windmill, a vertical shaft, a plurality of rims carried thereby, a plurality of vanes mounted to turn on vertical axes between the rims, a flexible, extensible ring surrounding the shaft and free to move eccentrically in relation thereto, connections between the ring and vanes, a governing cone moving longitudinally in relation to the shaft, and means for moving the cone to engage with the ring.

24. In a windmill, a vertical shaft, a plurality of rims carried thereby, a plurality of vanes mounted to turn on vertical axes between the rims, a flexible, extensible ring surrounding the shaft and free to move eccentrically in relation thereto, connections between the ring and vanes, a governing cone surrounding the shaft and capable of longitudinal movement in relation thereto, and means controlled by the rotation of the mill to move said cone.

25. In a windmill, a vertical shaft, a plurality of rims carried thereby, a plurality of vanes mounted to turn on vertical axes between the rims, a flexible, extensible ring surrounding the shaft and free to move eccentrically in relation thereto, connections between the ring and vanes to one side of the axes of the latter, a second ring surrounding the shaft, connections between the second ring and the vanes at the opposite side of the axes thereof, governing means moving longitudinally in relation to the shaft to confine and reduce the eccentricity of the ring, and connections between the said means and the second ring, whereby said second ring will be raised, by centrifugal stresses on the vanes, and will raise said governing means.

26. In a windmill, a vertical shaft, a plurality of rims carried thereby, a plurality of vanes mounted to turn on vertical axes between the rims, a flexible, extensible ring surrounding the shaft, free to move eccentrically in relation thereto, connections between the ring and vanes at one side of the axes thereof, a second ring surrounding the shaft, connections between said ring and vanes at the opposite side of the axes thereof, a governing cone surrounding the shaft, and capable of movement longitudinally in relation thereto, and connections between said cone and said second ring.

27. In a windmill, a vertical shaft, a plurality of rims carried thereby, a plurality of vanes mounted to turn on vertical axes between the rims, a flexible, extensible ring surrounding the shaft, free to move eccentrically in relation thereto, connections between the ring and vanes at one side of the axes thereof, a second ring surrounding the shaft, connections between said ring and vanes at the opposite side of the axes thereof, a governing cone surrounding the shaft and capable of movement longitudinally in relation thereto, connections between said cone and second ring, and means for manually raising the second ring.

28. A windmill having a vertical shaft, rims carried by the shaft and spaced apart, a plurality of vanes turning on vertical axes between the rims, a transmission ring surrounding the shaft, an arm on each vane, stays connecting the arm and ring, said stays being normally slack, and said arms lying at an angle to the vanes greater than 90°.

This specification signed and witnessed this eleventh day of March, 1915.

ROBERT CLADE.

Witnesses:
LEONARD H. DYER,
J. F. COLEMAN.

Copies of this patent may be obtained for five cents each, by addressing the "Commissioner of Patents, Washington, D. C."